(12) United States Patent  (10) Patent No.: US 6,614,744 B2
Trezza  (45) Date of Patent: Sep. 2, 2003

(54) METHOD AND APPARATUS FOR READING OUT AND WRITING TO AN OPTICAL DISC

(75) Inventor: John A. Trezza, Nashua, NH (US)

(73) Assignee: Teraconnect, Inc., Nashua, NH (US)

( * ) Notice: Subject to any disclaimer, the term of this patent is extended or adjusted under 35 U.S.C. 154(b) by 348 days.

(21) Appl. No.: 09/727,951

(22) Filed: Dec. 1, 2000

(65) Prior Publication Data

US 2001/0030924 A1 Oct. 18, 2001

Related U.S. Application Data

(60) Provisional application No. 60/168,492, filed on Dec. 2, 1999.

(51) Int. Cl.$^7$ ................................................. G11B 7/00
(52) U.S. Cl. .................. 369/121; 369/44.12; 369/44.37
(58) Field of Search ............................ 369/44–37, 120, 369/121, 53.19, 116, 47.16, 44.12

(56) References Cited

U.S. PATENT DOCUMENTS

| | | | |
|---|---|---|---|
| 5,066,138 A | 11/1991 | Toide et al. | |
| 5,305,299 A | 4/1994 | Maeda | |
| 5,679,947 A | 10/1997 | Doi et al. | |
| 5,703,863 A | 12/1997 | Doi et al. | |
| 5,737,284 A | 4/1998 | Yamada | |
| 5,786,947 A | 7/1998 | Maeda et al. | |
| 5,858,814 A | 1/1999 | Goossen et al. | |
| 5,987,001 A | 11/1999 | Ishioka et al. | |
| 6,272,101 B1 * | 8/2001 | Morton .................... | 369/121 |

OTHER PUBLICATIONS

PCT International Search Report dated Jun. 13, 2001 of International Application No. PCT/US00/42442 filed Dec. 01, 2000.

Krishnamoorthy, Ashok V., Firehose Architectures for Free–Space Optically–Interconnected VLSI Circuits, Special Issue on Parallel Computing with Optical Interconnects, Journal of Parallel and Distributed Computing, Nov. 1996, pp. 1–10 complete article also see marked up cover and p. 6 included.

Travers, Christine M. et al., VLSI Photonic Smart Pixel Array for I/O System Architectures, pub Jan. 1998, This is best copy found.

Kitayama, Ken–Ichi et al, Two Dimensional Parallel Optical Data Link: Experiment* IEEE, 1996 pp. 206–214.

Neff, John A. et al. VCSEL/CMOS Smart Pixel Arrays for Free Space Optical Interconnects, IEEE 1996 pp. 282–289.

Kosaka, Hideo et al., Plastic–Based Receptacle–Type VCSEL–Array Modules with One and Two Dimensions Fabricated Using the Self Allignment Mounting Technique, IEEE 1987 or 1997 pp. 382–385 This is best copy found.

(List continued on next page.)

*Primary Examiner*—Nabil Hindi
(74) *Attorney, Agent, or Firm*—Maine & Asmus

(57) ABSTRACT

A method and apparatus utilizing a multiple quantum well modulator/emitter/detector pixel in a bilinear array permits reading or writing to an optical disc in parallel such that information may either be written to or read from an optical disc within one revolution of the optical disc. Thus while existing DVD and CDROM systems operate by sensing the contents of a spiral track, parallel readout afforded by the multiple quantum well modulator/emitter/detector provides as much as 1,000:1 advantage over single detector systems, with the biasing of the modulator/emitter/detector device determining whether the device is an emitter, detector or modulator. The co-location of the modulator/emitter/detector in a single device permits arranging devices in a linear array which is disposed over the optical disc for the parallel read/write functions.

9 Claims, 5 Drawing Sheets

OTHER PUBLICATIONS

M. Ajmone Marsan et al, Modelling Slotted Multi–Channel Ring All–Optical Networks, *IEEE*, 1997, p. 146–153.

Marco Ajmone Marsan et al, Access Protocols for Photonic WDM Multi–Rings with Tunable Transmitters and Fixed Receivers, *SPIE*, pp. 59–72, vol. 26921.

Carl Beckmann, Applications: Asynchronous Transfer Mode and Synchronous Optical Network, *Handbook of Fiber Optic Data Communication*, 1998, pp. 385–414, Academic Press.

Floyd E. Ross, An Overview of FDDI: The Fiber Distributed Data Interface, *IEEE Journal on Selected Areas in Communications*, Sep. 1989, pp. 1043–1051, vol. 7 No. 7.

* cited by examiner

READ MODE OPTION 1

LOW REFLECT    DETECT MODE

READ MODE OPTION 2

EMIT MODE    DETECT MODE

WRITE MODE OPTION 1

HIGH REFLECT    DETECT MODE

WRITE MODE OPTION 2

EMIT MODE    DETECT MODE

METHOD AND APPARATUS FOR READING OUT AND WRITING TO AN OPTICAL DISC

RELATED APPLICATIONS

The present application claims priority from U.S. Provisional Patent Application No. 60/168,492 filed Dec. 2, 1999.

FIELD OF INVENTION

This invention relates to the readout of and the writing to an optical disc and more particularly to a method and apparatus for performing these functions in parallel through the utilization of a multiple quantum well device.

BACKGROUND OF THE INVENTION

Advances in semiconductor technology over recent decades have led to ever increasing capability. With this capability comes the need to process ever more data. Closely related to this need is the need to store and to retrieve data at ever increasing rates and quantities. There have been numerous technical advances in the technology of storing and retrieving data, but these approaches have been largely incremental.

The development of significant improvements in read/write technology, not only will improve the efficiency of data transfer to and from a storage medias such as an optical disc, it will also enable applications which can use the improved read/write technology across a wide variety of industries due to the increased ability to access information.

Nowhere is this more important than in the optical disc field. Here, either DVD discs or CDROM discs are presently read out in a serial fashion by a single read head. Likewise encoding or writing to optical discs is presently accomplished by a single write head. The utilization of a single head moved in a spiral pattern above an optical disc leads to the ability to transmit data only in a serial manner such that many revolutions of the optical disc are required to transfer data.

There thus exists the problem of how to decrease the time it takes to perform a read function of an optical disc. Existing DVD and CDROM systems operate by sensing the contents of tracks. The tracks are semi-circular segments of the disc from which the DVD or CDROM is made. To read the entire contents requires many rotations of the DVD or CDROM. What is needed is a way to decrease the time it takes to read the contents of a DVD or CDROM.

Moreover, there is a problem of how to simultaneously read and write data onto an optical disc. Existing technology requires that reading and writing to a disc be done sequentially. Doing so consumes considerable time. What is needed is a way to read and write simultaneously to a disc.

Moreover, there is a requirement to reduce the number of moving parts related to the transfer of data to and from an optical disc. Currently available optical discs have a laser read/write assembly that spirals in and out to address all of the tracks on the disc. This motion requires two degrees of freedom, and hence includes complexity that a system with a single degree of freedom lacks. What is needed is a way to reduce the number of degrees of freedom so that fewer moving parts are required.

Of course with improved technology there is a possibility of reducing the power required for read/write operations to an optical disc. Reducing power used to write new data to an optical disc is desirable in part for economic reasons, but mostly for reliability issues. What is needed is a way to reduce the power required for read/write operations on an optical disc.

As illustrated in U.S. Pat. Nos. 5,679,947; 5,066,138; 5,305,299; 5,786,947; 5,737,284; and, 5,987,001 there have been many systems devised for reading to an optical disc and writing to it.

U.S. Pat. No. 5,679,947 describes an optical device having a light emitter and a photo sensor, whereas U.S. Pat. No. 5,066,138 refers to the use of holographic elements. U.S. Pat. No. 5,305,299 describes a support mechanism for an optical block in optical disc drive, whereas U.S. Pat. No. 5,786,947 describes an optical pick up device for condensing light from a light source on a single recording surface. Finally U.S. Pat. No. 5,737,284 describes a rapid access to a target track within a program area, whereas U.S. Pat. No. 5,987,001 describes an optical disc drive changer.

It will be appreciated that none of the above reference describe parallel read/write capabilities and as such do not offer the advantages of parallel capabilities in so far as reading and writing to an optical disc.

SUMMARY OF THE INVENTION

In the subject invention, parallel read/write capability is provided by the use of a multiple quantum well modulator/emitter/detector device which functions in either one of the three modes dependent upon biasing. These devices are located in a linear array over the surface of an optical disc. In one embodiment, the devices are paired so that the first of the devices operates as a light source, whereas the second of the devices in the linear array operates as a detector of the light reflected from the surface of the disc. It will thus be seen that data can be read from the disc in parallel, with the linear array of devices in one embodiment numbering 1000. This means that the linear array extends radially across the top surface of the disc from the periphery to the center of the disc.

Because of the multiple functionality of the device, the devices can be co-located into what is termed hereinafter a bi-linear array. This multiple functionality is achieved in one embodiment through the utilization of a multiple quantum well device which responds to biasing to determine its function.

For gallium arsenide multiple quantum well devices it has been found that the switching via biasing can be made to occur as fast as the drive signals can be changed. Thus, in one embodiment, a single multiple quantum well device can be used sequentially to emit or reflect light and then to detect the reflected light from the optical disc.

Regardless, the use of such multifunctional devices permits a linear array to be used in the read/write functions so that all information transfer can occur with a single revolution of the optical disc.

In summary, a method and apparatus utilizing a multiple quantum well modulator/emitter/detector pixel in a bilinear array permits reading or writing to an optical disc in parallel such that information may either be written to or read from an optical disc within one revolution of the optical disc. Thus while existing DVD and CDROM systems operate by sensing the contents of a spiral track, parallel readout afforded by the multiple quantum well modulator/emitter/detector provides as much as 1,000:1 advantage over single detector systems, with the biasing of the modulator/emitter/detector device determining whether the device is an emitter, detector or modulator. The co-location of the modulator/emitter/detector in a single device permits arranging devices in a linear array which is disposed over the optical disc for the parallel read/write functions.

BRIEF DESCRIPTION OF THE DRAWINGS

These and other features of the subject invention will be better understood in connection with the Detailed Description in conjunction with the Drawings of which.

DETAILED DESCRIPTION

Figure 1:
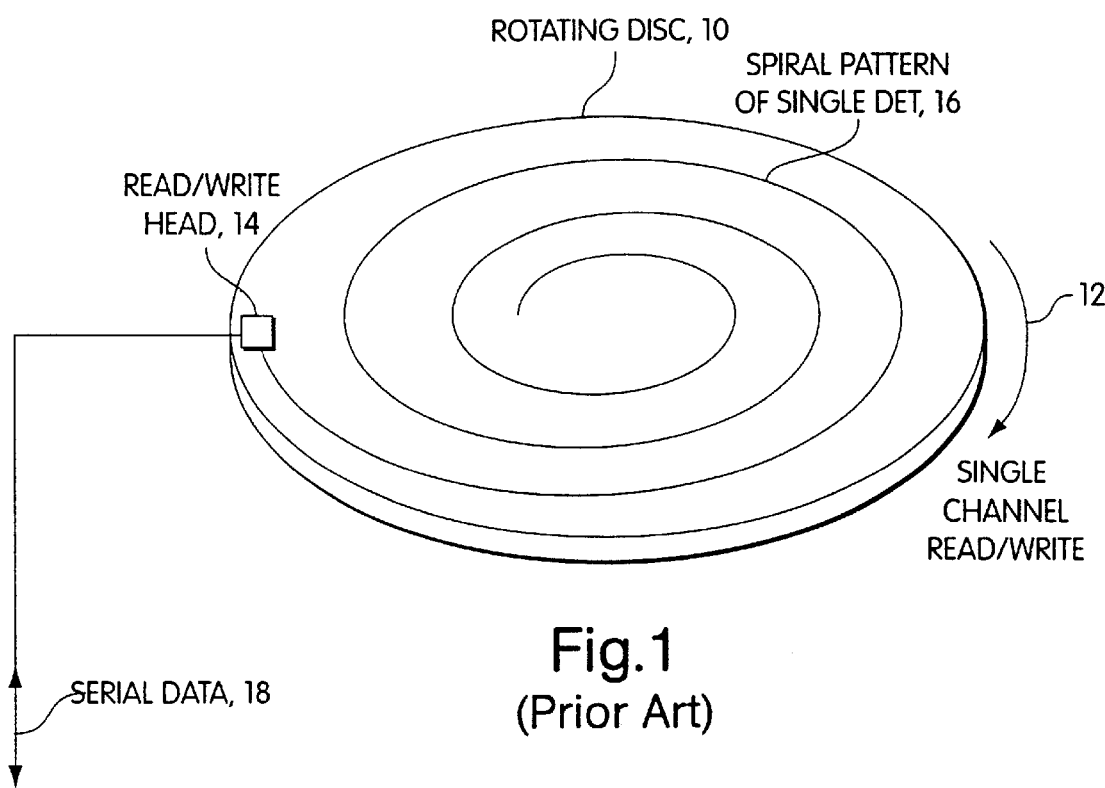
FIG. 1 is a diagrammatic representation of a typical prior art optical disc in which a read/write head travels in a spiral pattern over the disc, yielding a serial data output or a serial data input.

Referring now to FIG. 1, in the prior art an optical disc 10 is rotated in the direction of arrow 12 underneath a read/write head 14. Head 14 is driven inwardly towards the center of the rotating disc so as to effectuate a spiral pattern herein illustrated at 16. The result for either the read or write function is that the transmission of serial data as illustrated at 18.

Figure 2:
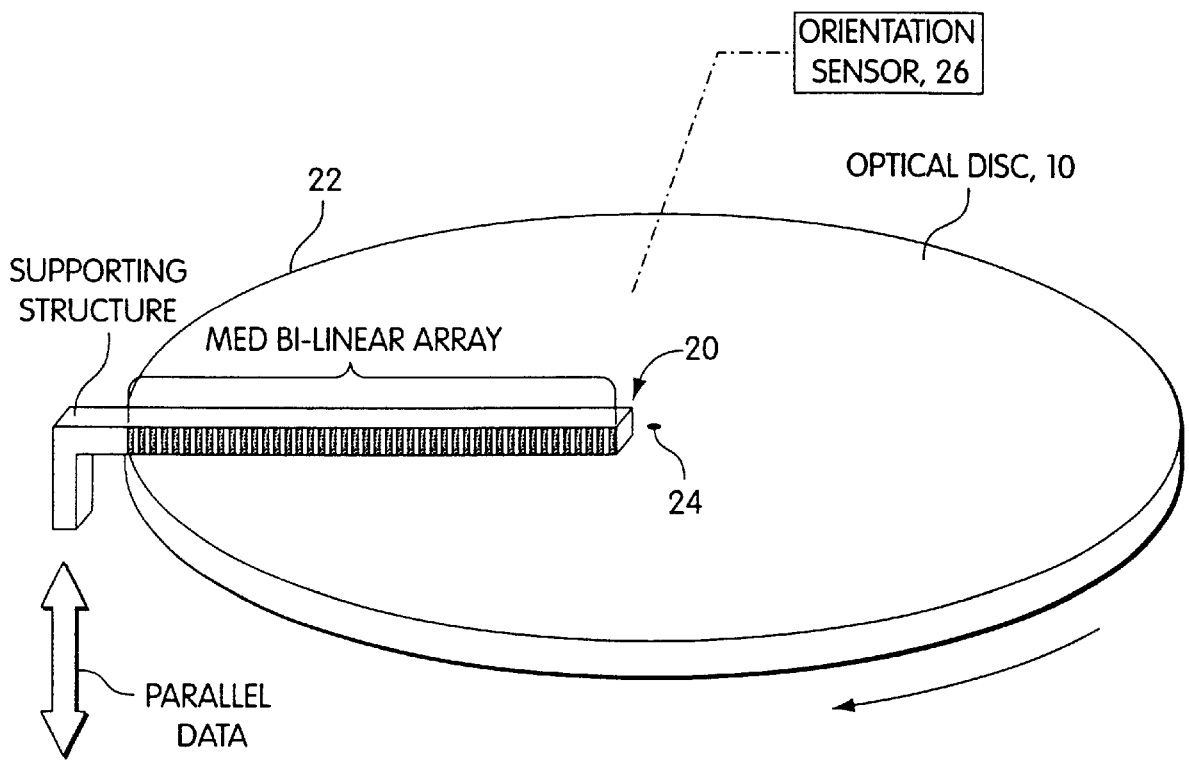
FIG. 2 is a diagrammatic representation of the subject bi-linear array which supports parallel data transfer.

Referring now to FIG. 2, what is shown is the preferred embodiment of the invention. Optical disc 10 rotates about its center axis. A supporting structure, attached to a frame (not shown) supports a modulator/emitter/detector pixel (MED) linear array 20 that extends radially inwards from the edge 22 to a point near the center 24 of the optical disc. The supporting structure also contains a sensing means 26 to determine the orientation of the disc. The bi-linear array 20 consists of pairs of modulator/emitter/detector, MED, pixels. MED pixels consist of multiple quantum well structures, such as shown in FIGS. 3–7 with electrical contacts on each end. Their functionality depends on the applied bias across the quantum well structure.

Figure 3:
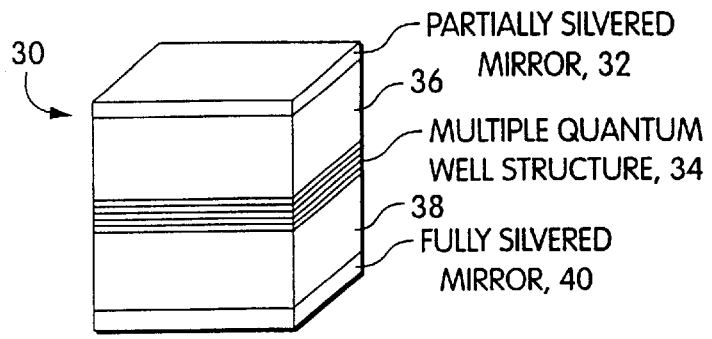
FIG. 3 is a diagrammatic representation of a multiple quantum well device for use as an element in a bi-linear array of FIG. 2.

FIG. 3 illustrates an MED device, here illustrated at 30 to include a partial silvered mirror 32 at the top with a multiple quantum well structure 34 sandwiched between oppositely doped regions 36 and 38. At the bottom of device 30 is a fully silvered mirror 40.

Figure 4:
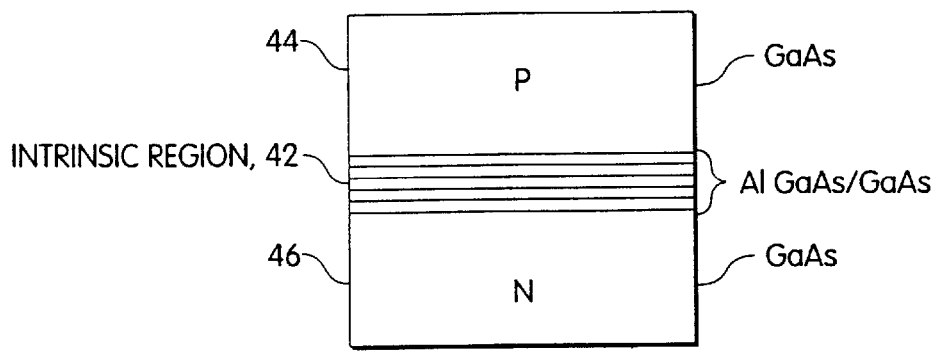
FIG. 4 is a diagrammatic illustration of the doping to produce a multiple quantum well device.

Referring to FIG. 4, the multiple quantum well structure provides the intrinsic region 42 between a P-doped region 44 and an N-doped region 46. Both the P and N-doped regions are gallium arsenide. The alternating layer structure of the intrinsic region is provided by alternating layers of aluminum gallium arsenide and gallium arsenide.

Figure 5:
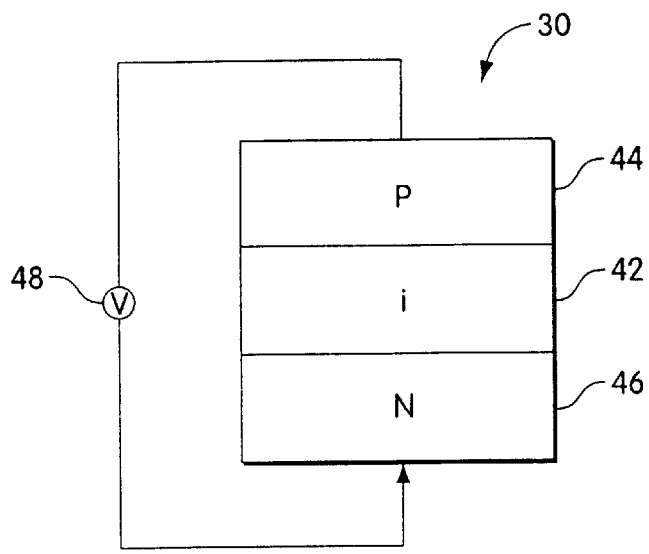
FIG. 5 is a diagrammatic representation of the biasing of the device of FIG. 4.

Referring now to FIG. 5, device 30 is biased as illustrated by voltage 48 to perform the above mentioned functions.

Figures 6, 7:
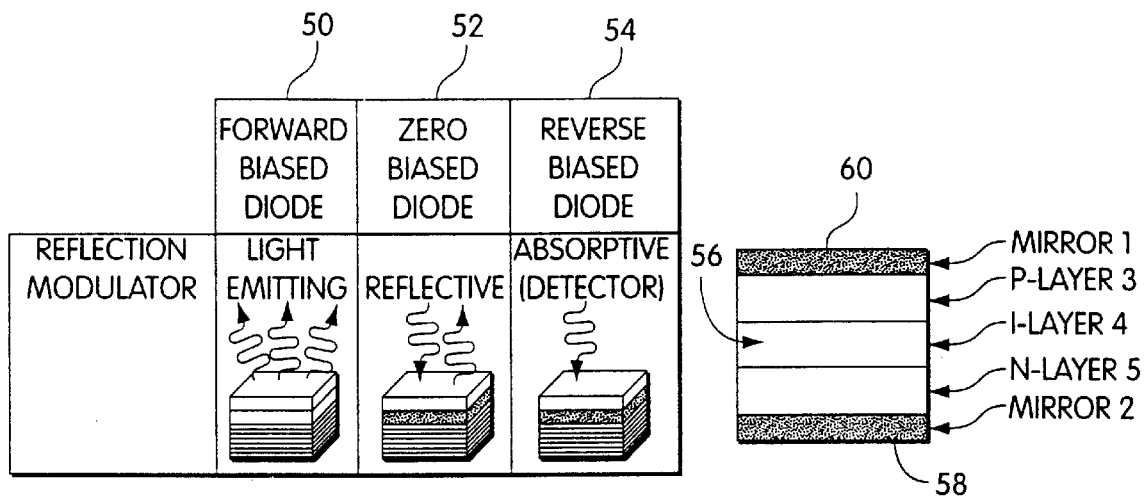
FIG. 6 is a chart showing the effect of biasing on the multiple quantum well device of FIG. 3.
FIG. 7 is a diagrammatic illustration of the FIG. 3 device, further illustrating the structure of the device.

More particularly and referring to FIG. 6, the basic structure of an MED pixel can be switched between highly reflective and highly absorptive states or between emitting and absorptive states as illustrated by the forward biasing illustrated at 50, the 0 biasing as illustrated in 52 and the reverse biasing as illustrated at 54. As shown in FIG. 7, in this device, the cavity generally illustrated at 56 contains a back mirror 58 that is much more highly reflective than the front mirror 60. When the applied bias is zero, the quantum well excitons provide little absorption at the operating wavelength. Incident light entering the cavity region is eventually reflected out of the cavity by the strong back mirror. With reverse applied bias, the cavity absorption is increased to the point where all of the incident light is absorbed as the photons oscillate in the cavity. Because of this absorption, such pixels can act as intensity modulators or as detectors.

Figure 8:
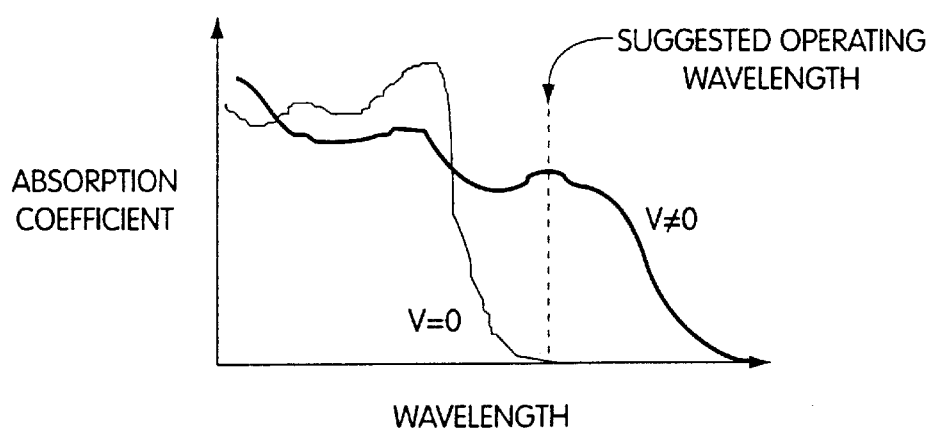
FIG. 8 is a waveform diagram of the response of the device of FIG. 7 to biasing in terms of absorption coefficient vs. wavelength.

FIG. 8 shows the absorption spectrum of a MED structure under two different bias conditions. When there is no applied bias, there is a region of high absorption and a region of low absorption. When there is a positive bias applied, the previously low absorption region shifts to longer wavelength so that the absorption is nearly uniform across the spectrum near the suggested operating wavelength. By using a wavelength in the range indicated in FIG. 8, changing the applied bias signal can change the absorption and reflectivity of the MED structure.

By applying a forward bias to one pixel of the MED pixel pair and reverse biasing the other, one pixel will emit light while the other pixel absorbs light. By positioning the optical disc in close proximity to the MED bi-linear array, light emitted by the forward biased pixel illuminates a small portion of the surface of the disc while the reverse biased pixel senses the reflectance of that small area. Thus, each MED pixel pair probes the surface of the disc and can determine whether a logical 0 or 1 has been stored in the small area.

By increasing the drive current to a forward biased MED pixel, it can emit enough light to modify the surface of the optical disc, i.e., write a bit of data.

Figure 9:
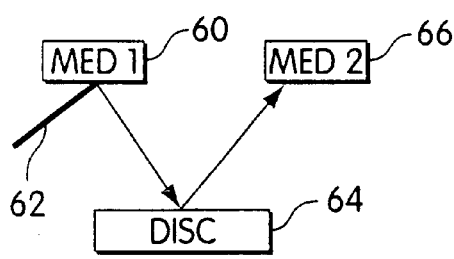
FIG. 9 is a block diagram of a read mode option utilizing two co-located modulator/emitter/detector devices.
Figure 11:
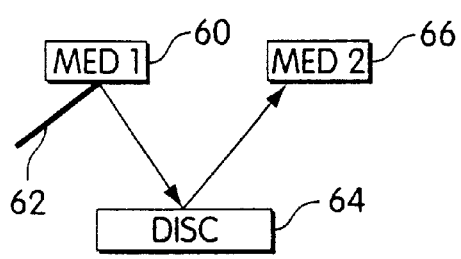
FIG. 11 is block diagram illustrating a write mode option in which one of the modulator/emitter/detector devices is made highly reflective to reflect light onto a disc; and, FIG. 12 is a block diagram in which one of the devices is an active emitter to provide a second write mode option.

Alternatively, as shown in FIG. 9, the MED pixel can be used in a way such that in the read mode the reflectivity of the reflective pixel is made just high enough to provide enough light for readout. Here, a first MED 60 is utilized to reflect light 62 onto disc 64, from whence is reflected to MED 66. The same MED pixel structure could be used to write, as shown in FIG. 11, by increasing its reflectivity such that the power of reflected light from the now very highly reflective pixel is high enough to modify the surface of the disk i.e. write a bit of data.

Figure 10:
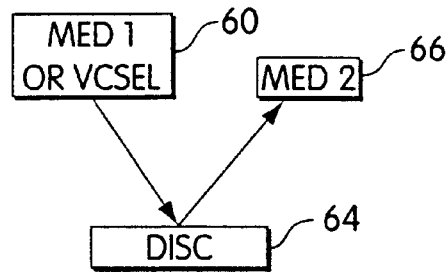
FIG. 10 is a block diagram showing a second read mode option in which one modulator/emitter/detector device emits light.
Figure 12:
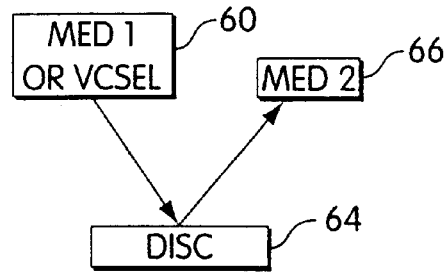

In another embodiment, as illustrated in FIG. 10, the first MED device 60 of each pair could be replaced by a vertical cavity surface emitting laser, VCSEL, and operated only between the emitting modes where the amount of emitted light would determine whether a read operation, as shown in FIG. 10, or a write operation, as shown in FIG. 12, was performed.

Finally, a single MED pixel could be used in place of a pair of MED pixels for each sensed/written bit. This method could be achieved by rapidly switching between reflective and absorptive or between emitting and absorbing modes and having one pixel perform the functions of two pixels. This can be achieved because the MED pixels can switch functions at gigahertz rates while the spinning of the disk occurs in the microsecond time scales, which are clearly far slower. Therefore, as far as the disk was concerned, a single pixel 'looks' like two pixels in this operating mode.

Given the very high switching speed of the MED pixels and the relatively long dwell time on each bit site, read times can be reduced substantially, thus lowering power requirements and increasing lifetimes. These same factors also apply to write operations, i.e., the duration of the write process can be optimized to provide a long system lifetime. Also because the entire disk can be read in one rotation, enormous quantities of power are saved compared to the motor power required to rotate conventional CDROMS or DVD disks many times in a typical read operation.

The switching speed of the MED pixels is of the order of gigahertz, while the rotation rate of the optical disc is of the order of hundreds of hertz. Consequently, whenever the surface of the optical disc is being probed, the surface is effectively standing still. There is therefore enough time to read any given bit on the disc, and then write new information to that bit site if desired.

Control of the bias condition of each pixel is accomplished with CMOS circuitry, so that with the appropriate logic instruction the MED pixel pair is either reading or writing. All of the MED pixel pairs can be addressed simultaneously, so all of the bits in a given radius of the disc can be read at once. With rotational motion of the disc and appropriate timing using the CMOS circuitry, the entire disc can be read. Likewise, the entire disc can be written to in one rotation. By implementing both read and write operations within the time it takes an MED pixel pair to traverse a bit on the optical disc, all of the data on the disc can be read and modified. Thus, the problem has been solved.

Having now described a few embodiments of the invention, and some modifications and variations thereto, it should be apparent to those skilled in the art that the foregoing is merely illustrative and not limiting, having been presented by the way of example only. Numerous modifications and other embodiments are within the scope of one of ordinary skill in the art and are contemplated as falling within the scope of the invention as limited only by the appended claims and equivalents thereto.

Moreover, other embodiments will occur to those skilled in the art and are within the following claims:

What is claimed is:

1. A method for increasing the rate at which data can be written to or read from an optical disc, comprising the steps of:
   providing a linear array of multiple quantum well modulator/emitter/detector devices above an optical disc;
   rotating the disc one revolution;
   biasing selected devices to perform the appropriate modulator/emitter/detector function; and,
   reading out or writing to the disc in parallel using the linear array.

2. The method of claim 1, and further including the step of ascertaining the orientation of the optical disc relative to the linear array and adjusting the orientation to an optimal orientation.

3. The method of claim 1, wherein the multiple quantum well devices are made from appropriately doped gallium arsenide P and N regions and wherein an intrinsic region is made from alternating layers of aluminum gallium arsenide and gallium arsenide.

4. A bi-linear array of elements for use in writing to or reading an optical disc, comprising:
   a number of co-located modulator/emitter/detector elements, each of said elements including a multiple quantum well device having a cavity defined by mirrors at either end thereof, one of said mirrors being filly reflective and the other of said mirrors being partially reflective, each of the devices in said array being biasable to perform modulator/emitter/detector functions; and,
   a biasing source for applying a predetermined bias across each of said devices.

5. The bi-linear array of claim 4, and further including means coupled to said array for driving said bi-linear array to write data to said disc.

6. The bi-linear array of claim 4, and further including means coupled to said array for producing a parallel readout of said array.

7. Apparatus for increasing the rate at which data can be written to or read from an optical disc, comprising:
   a linear array of multiple quantum well modulator/emitter/detector devices;
   a support for mounting of said linear array above said optical disc;
   a device for rotating said disc one revolution;
   a voltage source for biasing selected devices to perform the appropriate modulator/emitter/detector function; and,
   means for reading out or writing to said disc in parallel using said linear array.

8. The apparatus of claim 7, and further including a detector for ascertaining the orientation of said optical disc relative to said linear array and a mount for adjusting the orientation of said optical disc to an optimal orientation.

9. The apparatus of claim 7, wherein said multiple quantum well devices are made from appropriately doped gallium arsenide P and N regions and wherein an intrinsic region is made from alternating layers of aluminum gallium arsenide and gallium arsenide.

* * * * *